United States Patent

[11] 3,609,245

[72] Inventors Kurt Richter
Stuttgart-Rot;
Horst Woller, Korntal, both of Germany
[21] Appl. No. 824,445
[22] Filed May 14, 1969
[45] Patented Sept. 28, 1971
[73] Assignee International Standard Electric Corporation
New York, N.Y.
[32] Priority May 21, 1968
[33] Germany
[31] P 17 62 299.0

[54] ARRANGEMENT FOR ENABLING AN EXISTING CALL TO BE TEMPORARILY INTERRUPTED
4 Claims, 2 Drawing Figs.

[52] U.S. Cl. 179/18 B, 179/6 C
[51] Int. Cl. H04m 3/42
[50] Field of Search 179/18 BG, 18 BH, 27 FE

[56] References Cited
UNITED STATES PATENTS

| | | | |
|---|---|---|---|
| 3,190,965 | 6/1965 | Zarouni | 179/18 BH |
| 3,544,725 | 12/1970 | Baur | 179/18 B |

*Primary Examiner*—William C. Cooper
*Attorneys*—C. Cornell Remsen, Jr., Walter J. Baum, Percy P. Lantzy, J. Warren Whitesel, Delbert P. Warner and James B. Raden

ABSTRACT: The circuit enables an existing call to be interrupted without being cancelled. This is of particular significance for subscribers connected via their telephone sets to a dictating machine or a teaching machine for some length of time. According to another aspect the same interruption facilities are provided for interrupting a call to another subscriber after the call has lasted a predetermined, minimum time.

PATENTED SEP 28 1971 3,609,245

INVENTORS

K. RICHTER H. WOLLER

BY D. O. Warner

ATTORNEY

ARRANGEMENT FOR ENABLING AN EXISTING CALL TO BE TEMPORARILY INTERRUPTED

Figure 1:
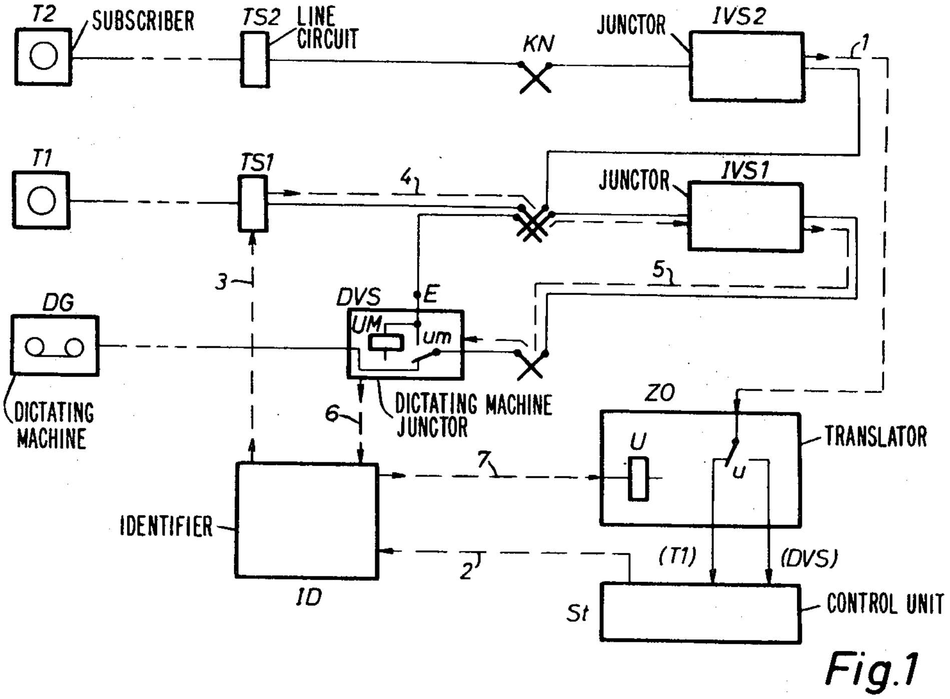

This invention relates to a circuit arrangement for telephone exchanges to enable an existing call to be temporarily interrupted by another call for a subscriber who has been connected for some time to a dictating machine, a teaching machine or some other supplementary equipment or a long conversation with another subscriber.

A large number of publications, as for example the German published applications DAS 1,139,158 and 1,155,821, reveal circuit arrangements which permit specially authorized subscribers to "butt in" on an existing call without having to wait for the end of the existing call to impart urgent or important information. Such facilities are restricted to specially authorized subscribers with good reason, as they entail considerable expense and greatly complicate the working of telephone traffic. Thus the general introduction of such interruption facilities for all subscribers is not possible with the known methods. As a rule, it is expected of a subscriber to wait until an engaged subscriber has finished his call, particularly as the average duration of calls is about 3 minutes.

Where central dictating machines, teaching machines or other supplementary equipment are used, the average call duration is well above that given above. In the case of known central dictating machines, such as that revealed in the German published application DAS 1,173,543 for example, a subscriber connected to such a dictating machine cannot be called for considerable lengths of time by unauthorized callers, which is also considered a disadvantage by the person dictating.

It is an object of the invention to provide a circuit arrangement which makes it possible for any caller to interrupt a call made or received by a subscriber who has been engaged for some time.

Circuits have already been proposed (e.g. German application No. St 25,171 VIII*a*/21*a*3 now German published application DAS 1,266,818) which permit a subscriber to give a "-call-waiting" signal when attempting to call an engaged subscriber, which signal indicates to the engaged subscriber that a new call is waiting. The called subscriber then has to decide whether to terminate the existing call in favor of the new one. With such a circuit arrangement, if the existing call is terminated it is completely cancelled and the conversation or the like cannot be resumed after the new call has been terminated without new measures being taken to establish the interrupted and cancelled connection once more. In the case of a connection to a dictating machine there is the added difficulty that it is impossible to reestablish a connection to the same recording tape of the dictating machine in order, for example, to hear the sentences last dictated, since special guard means are provided to prevent this in order that a tape which has been used by one subscriber cannot be heard or erased by a third subscriber in an unauthorized manner.

However, the circuit arrangement of the invention is to be such that the "engaged" subscriber can resume the originally existing call after the interrupting call has terminated, such that he can, for example, have the matter already dictated played back to him if desired. The same applies to original connections to other supplementary equipment, such as teaching machines, or to a call made with another subscriber.

The circuit arrangement of the invention solves the above problem by examining the existing circumstances to determine whether the called subscriber is connected to, for example, a dictating machine and if so, to which such supplementary equipment. In case of a positive result of the examination, a connection is established between the caller and a special inlet of the thus determined junctor of the supplementary equipment. The existing connection of the called subscriber in this junctor is then transferred to said special inlet, the called subscriber having facilities to switch his connection in the junctor from the said special inlet back to the supplementary equipment when the interrupting call has terminated.

Thus this circuit arrangement makes it possible for any subscriber connected for some length of time to a supplementary apparatus to be called by any caller, without it being necessary to change the existing distribution of authorization to apply call-waiting signals. If it is desired to avoid the execution of a special identifying operation at every call, a further feature of the invention proposes that when a supplementary apparatus is engaged by a subscriber the said subscriber is identified and marked in the class-of-service translator and that only when a called and engaged subscriber is marked in this manner is a second identifying operation carried out to discover which supplementary equipment the called subscriber is connected to. Thus in all ordinary cases of engagement or when the called subscriber is not engaged no identifying operation will be carried out.

Where the owner of a private branch exchange desires that all subscribers should have facilities to interrupt an existing call when a called subscriber is found to be engaged for some time, the invention provides a solution which consists in that all internal junctors are provided with a special inlet and a time switch, such as a thermo-relay. After a predetermined time of engagement of the existing call, the time switch allows the called subscriber to be switched over to the special inlet (E) and causes a connection to be made from the special inlet (E) to the caller, and after the interrupting call has been terminated the called subscriber has facilities to switch his connection from the special inlet (E) back to the waiting subscriber with whom he was originally connected.

Unlike a general introduction of "call-waiting" signal facilities of the known type for all subscribers the circuit arrangement of the invention in the present case involves little additional expense in the exchange. The undesirable interruption of short calls is guarded against by a time switch.

Normally, it is desirable not to provide some of the extensions with facilities for interrupting existing calls. In such cases the internal, that is, own-exchange junctors may all be provided with the special inlet, due to its low cost, but the said few extensions are refused the possibility of switching to said special inlet.

Further developments of the invention are described in the claims and in the following description of the drawings.

FIG. 1 shows the circuit arrangement of the invention as a block diagram.

Figure 2:
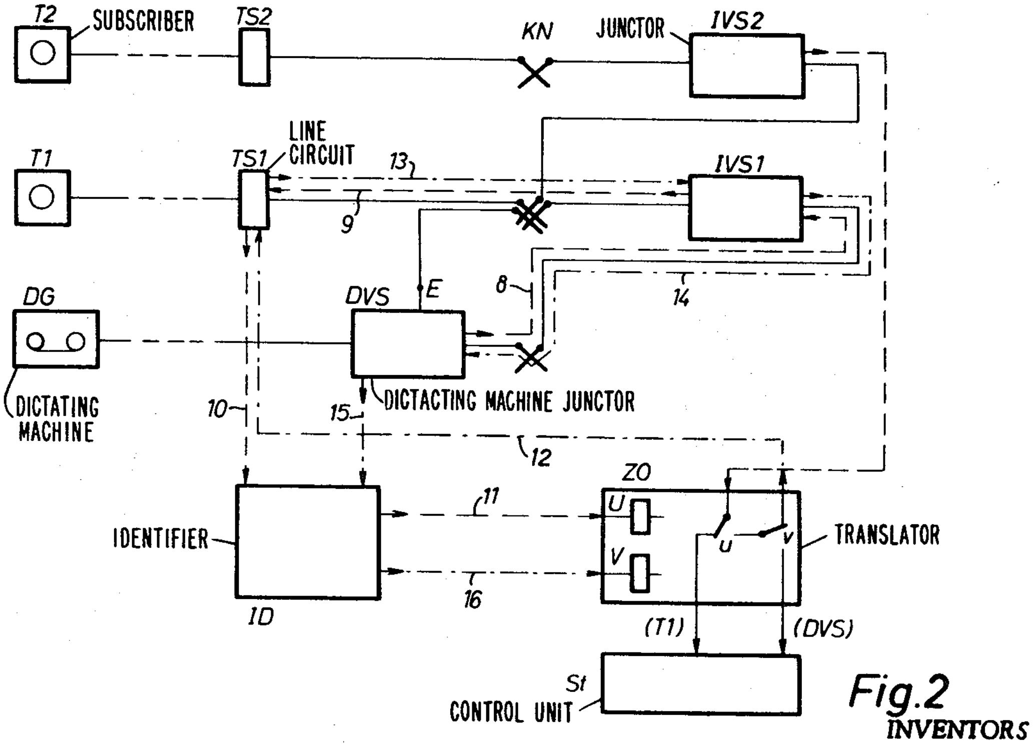

FIG. 2 serves to illustrate an operation of an embodiment of the invention.

It is assumed that the subscriber T1 in FIG. 1 is connected to the dictating machine DG. The connection is established via the subscriber line circuit TS1, the cross-point network KN, the own-exchange junctor IVS1, once more the cross-point network and the dictating machine junctor DVS. It is further assumed that while this connection is still established the subscriber T2 attempts to call the subscriber T1 via the own-exchange junctor IVS2. When this occurs, the translator ZO is interrogated by the own-exchange junctor IVS2, via the conductor 1 represented by a dotted line, to determine whether the subscriber T1 is connected to any supplementary equipment. The control unit S*t* causes, via conductor 2, the identifier ID to determine the subscriber or equipment with which the subscriber T1 is connected. The identifier discovers this via the dotted-line conductors 3, 4, 5 and 6. The identity of the thus-determined dictating machine junctor DVS is transmitted to the translator ZO via the conductor 7, in which translator the relay U responds and changes the position of its contact *u*. This indicates to the control unit S*t* that the called subscriber T1 is connected to the dictating machine junctor DVS. The control unit then causes, in a manner not shown, a connection to be established between the busied own-exchange junctor IVS2 and the special inlet E of the dictating machine junctor DVS.

In the dictating machine junctor DVS the diagrammatically represented relay UM is activated, after a call-waiting signal has been given and the subscriber T1 has consented—if such facilities are provided—and the relay contact *um* establishes a connection between the subscriber T2 and the subscriber T1 via the own-exchange junctor IVS2, the dictating machine junctor DVS and the own-exchange junctor IVS1. In this way the connection between the subscriber T1 and the dictating junctor DVS is interrupted during the call between subscribers T1 and T2. At the end of the call between the subscribers T1 and T2, the contact *um* in the dictating machine junctor DVS may be switched back so as to break the connection between the subscriber T2 and the special inlet E of the dictating machine junctor. The subscriber T1 can then resume dictation. He can also, as will often be desirable, cause the passage already dictated to be played back to him.

With known means it can be easily arranged for the subscribers T1 and T2 not to be marked as connected to the dictating machine junctor during their call with each other, when a third caller wishes to call one or other of them. It is simply necessary to make this identifying operation dependent on the state of the relay UM.

In this case and in all cases where the engaged subscriber is not connected to supplementary equipment but to another subscriber, the identifying operation initiated by the control unit S*t* will not indicate supplementary equipment and the third, calling subscriber will receive an "engaged" signal in the usual manner.

However, this last-mentioned operation will be changed in the manner described above where it is desired for all of the own-exchange junctors to be provided with a special inlet E so that any long call can be interrupted by any subscriber.

A development of the invention will now be described with reference to FIG. 2, wherein it is not necessary in all cases where a subscriber is found to be engaged to initiate an identifying operation in order to discover whether the called subscriber is connected to a dictating machine and has been so for some time, for example. After the dictating machine junctor DVS has been busied, the busying subscriber T1 is identified via the dotted-line conductors 8, 9 and 10, and the symbolic relay U in the translator ZO is excited via the conductor 11 and changes the position of its contact *u*. In this way the subscriber T1 is characterized in the translator ZO as being connected to a dictating machine DG.

When a junctor, in the present example the junctor IVS2, makes a check on an engaged subscriber, in the present example the subscriber T1, it interrogates the translator ZO to determine whether the subscriber is connected to a dictating machine. This interrogation may be readily carried out at the same time as the interrogation of other class-of-service information of the called subscriber. If the called subscriber is not characterized in the translator as being connected to a dictating machine, no identifying operation is initiated and the calling subscriber receives an "engaged" signal.

If, however, the called subscriber, in the present example the subscriber T1, is characterized in the translator as being connected to a dictating machine, a second identifying operation is initiated. Information is gathered via the dot-dash conductors 12, 13, 14 and 15 as to which dictating machine junctor DVS has been busied by the subscriber T1. The result is transmitted through the conductor 16 to the translator ZO and via the contact *v* of the relay V to the control unit S*t*. The control unit S*t* then causes a connection to be established between the calling subscriber T2 and the special inlet E of the dictating machine junctor DVS in the manner described above. The description of the following operations need not be repeated.

We claim:

1. A circuit arrangement for telephone exchanges to enable an existing call between a first subscriber and supplementary equipment to be temporarily interrupted by a call from a second subscriber and then to be restored, comprising supplementary equipment, a junctor through which connections may be completed to the supplementary equipment, means over which a connection may be completed between a first subscriber and said junctor to permit information to be transmitted between the subscriber and the supplementary equipment, means responsive to a call from a second subscriber for determining when a first subscriber is connected to supplementary equipment and for providing a control signal indicating that the first subscriber is connected to supplementary equipment, means responsive to said control signal for coupling the second subscriber to a special inlet of the junctor connected to the supplementary equipment, means within the junctor for disconnecting the first subscriber from the supplementary equipment and for interconnecting the first subscriber and the second subscriber over the special inlet, said means within the junctor including the capacity to reconnect the first subscriber and the supplementary equipment.

2. A circuit arrangement as claimed in claim 1, in which the supplementary equipment includes dictating equipments, and means are provided for performing a second identifying operation to discover which dictating equipment the first subscriber is connected to.

3. A circuit arrangement for telephone exchanges to enable an existing call between a first subscriber and supplementary equipment to be temporarily interrupted by a call from a second subscriber and then to be restored, comprising supplementary equipment, a supplementary equipment junctor for interconnecting a first subscriber and the supplementary equipment, means including a further junctor for connecting a second subscriber to a special inlet in the supplementary equipment junctor, switching means for temporarily breaking the interconnection from the first subscriber to the supplementary equipment and for connecting the first subscriber and the second subscriber to each other, and means including said last named switching means for reestablishing the interconnection between the second party and the supplementary equipment when the interrupting call has terminated.

4. A circuit arrangement as claimed in claim 3, in which further means are employed to determine whether the second subscriber has authorization to interrupt existing calls, said further means limiting interruptions to calls from an authorized second subscriber.